US010609864B2

(12) United States Patent
Conrad et al.

(10) Patent No.: US 10,609,864 B2
(45) Date of Patent: Apr. 7, 2020

(54) PREDICTING GRAIN TANK LEVELS WHEN ON SLOPES OR HILLS

(71) Applicant: CNH Industrial America LLC, New Holland, PA (US)

(72) Inventors: Michael Conrad, Lititz, PA (US); Denver Yoder, Manheim, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/828,577

(22) Filed: Dec. 1, 2017

(65) Prior Publication Data
US 2019/0166761 A1 Jun. 6, 2019

(51) Int. Cl.
*A01D 41/127* (2006.01)
*G01F 23/00* (2006.01)
*G01C 9/00* (2006.01)
*A01D 41/12* (2006.01)
*A01F 12/60* (2006.01)

(52) U.S. Cl.
CPC ..... *A01D 41/1275* (2013.01); *G01F 23/0092* (2013.01); *A01D 41/1208* (2013.01); *A01F 12/60* (2013.01); *G01C 9/00* (2013.01)

(58) Field of Classification Search
CPC . A01D 41/1275; A01D 41/1208; A01F 12/60; G01C 9/00; G01F 23/0092
See application file for complete search history.

(56) References Cited

U.S. PATENT DOCUMENTS

| 5,488,817 | A | * | 2/1996 | Paquet | A01D 41/127 56/10.2 R |
| 5,529,537 | A | | 6/1996 | Johnson | |
| 7,877,181 | B2 | | 1/2011 | Chervenka et al. | |
| 8,380,401 | B2 | | 2/2013 | Pighi et al. | |
| 9,043,096 | B2 | | 5/2015 | Zielke et al. | |
| 9,213,905 | B2 | * | 12/2015 | Lange | G06K 9/00805 |
| 9,255,639 | B2 | * | 2/2016 | Dueckinghaus | A01D 41/1274 |
| 9,974,233 | B2 | * | 5/2018 | Ueda | A01F 12/60 |

(Continued)

FOREIGN PATENT DOCUMENTS

| CN | 204741825 U | 11/2015 |
| EP | 2250871 A1 | 11/2010 |
| JP | 2014068543 A | 4/2014 |

(Continued)

OTHER PUBLICATIONS

Extended European Search Report for EP Application No. 18203537.8 dated Jun. 4, 2019 (seven pages).

*Primary Examiner* — Russell Frejd
(74) *Attorney, Agent, or Firm* — Peter K. Zacharias; Patrick M. Sheldrake

(57) ABSTRACT

An embodiment includes a combine including a feeder housing for receiving harvested crop, a separating system for threshing the harvested crop to separate grain from residue, a grain tank for storing the separated grain, a grain tank level sensor for detecting a level of grain in the grain tank, an inclination sensor for detecting inclination of the combine, and a controller that controls the combine. The controller configured to receive the grain tank level from the grain tank level sensor, receive an inclination value from the inclination sensor, adjust the grain tank level based on the inclination value, and alert an operator of the adjusted grain tank level.

20 Claims, 9 Drawing Sheets

(56) References Cited

U.S. PATENT DOCUMENTS

2012/0253611 A1* 10/2012 Zielke .................. A01D 41/127
 701/50
2017/0112062 A1 4/2017 Holt, II et al.

FOREIGN PATENT DOCUMENTS

WO   2015069993 A2   5/2015
WO   2017187249 A1   11/2017

* cited by examiner

PREDICTING GRAIN TANK LEVELS WHEN ON SLOPES OR HILLS

FIELD

The invention relates to grain tank measurement system and method for predicting grain tank levels when the combine is on slopes or hills.

BACKGROUND

Harvesters (e.g. combines) are used to harvest crops. Operations performed by conventional combines include chopping the crop and collecting grain in a grain tank. These conventional combines, however, utilize grain quantity measurement devices and methods that are susceptible to grain measurement inaccuracies and grain spillage, especially when the combine is harvesting on a slope or a hill.

SUMMARY

An embodiment includes a combine comprising a feeder housing for receiving harvested crop, a separating system for threshing the harvested crop to separate grain from residue, a grain tank for storing the separated grain, a grain tank level sensor for detecting a level of grain in the grain tank, an inclination sensor for detecting inclination of the combine, and a controller that controls the combine. The controller configured to receive the grain tank level from the grain tank level sensor, receive an inclination value from the inclination sensor, adjust the grain tank level based on the inclination value, and alert an operator of the adjusted grain tank level.

An embodiment includes a method for controlling a combine including a chassis, a feeder housing for receiving harvested crop, a separating system for threshing the harvested crop to separate grain from residue, a grain tank for storing the separated grain, a grain tank level sensor for detecting a grain level in the grain tank, an inclination sensor for detecting inclination of the combine, and a controller that controls the combine. The method comprising receiving, by the controller, the grain tank level from the grain tank level sensor, receiving, by the controller, an inclination value from the inclination sensor, adjusting, by the controller, the grain tank level based on the inclination value, and alerting, by the controller, an operator of the adjusted grain tank level.

DETAILED DESCRIPTION

Aspects of the invention provide methods and systems for operator adjustable tank level measurement for implementation in a harvester combine.

The terms "grain," "straw," and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, material other than grain (MOG) or straw. Incompletely threshed crop material is referred to as "tailings." Also the terms "forward," "rearward," "left," and "right", when used in connection with the agricultural harvester (e.g. combine) and/or components thereof are usually determined with reference to the direction of forward operative travel of the combine, but again, they should not be construed as limiting. The terms "longitudinal" and "transverse" are determined with reference to the fore-and-aft direction of the agricultural combine and are equally not to be construed as limiting.

Figure 1A:
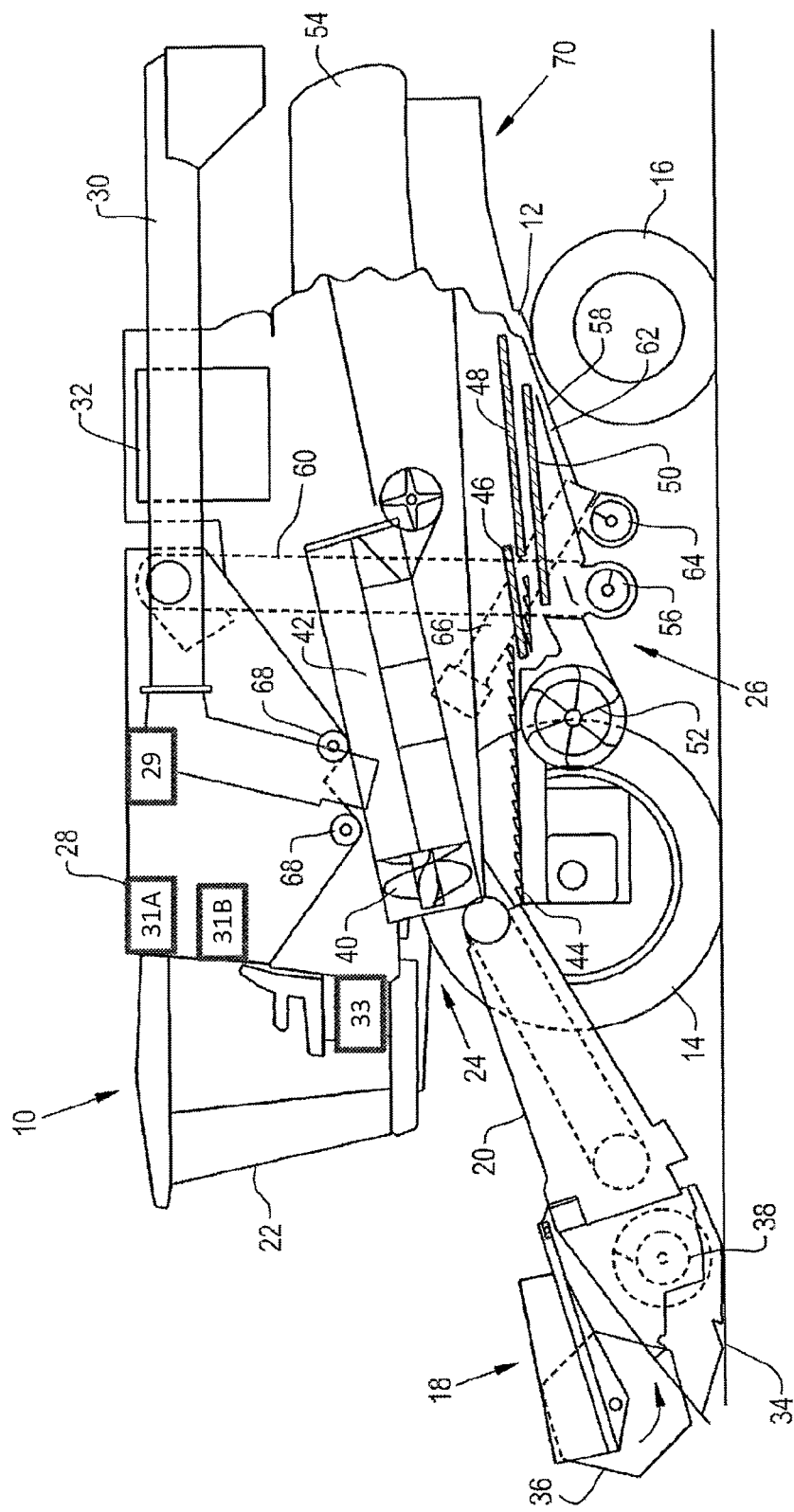
FIG. 1A is a side view of a combine, according to an embodiment of the invention.

Referring now to the drawings, and more particularly to FIG. 1A, there is shown one embodiment of an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading auger 30.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half-tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48 and 50 is subjected to a cleaning action by fan 52 which provides an airflow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of lower sieve 50. Clean grain auger 56 receives clean grain from each sieve 48, 50 and from bottom pan 62 of cleaning system 26. Clean grain auger 56 conveys the clean grain laterally to a generally vertically arranged grain elevator 60 for transport to grain tank 28.

Tailings from cleaning system 26 fall to a tailings auger trough 64. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

The non-grain crop material proceeds through a residue handling system 70. Residue handling system 70 includes a chopper, counter knives, a windrow door and a residue spreader. When combine 10 operating in the chopping and spreading mode, the chopper is set to a relatively high speed (e.g. 3,000 RPM), the counter knives may be engaged, the windrow door is closed and the residue spreader is running (e.g. rotating). This causes the non-grain crop material to be chopped in to pieces of approximately 6 inches or less and spread on the ground in a fairly uniform manner. In contrast, when combine 10 is operating in the windrow mode, the chopper is at a relatively low speed (e.g. 800 RPM), the counter knives are disengaged and the windrow door is open. The residue spreader may continue operation to spread only the chaff, with the crop material passing through the passageway created by the open windrow door.

The grain that is collected is measured to determine if the grain tank is full or not. The level of grain in grain tank 28 may be measured by different methods using different types of sensors. These sensors are positioned within grain tank 28 at locations suitable to measure the grain tank level.

In one example, a grain tank level sensor 29 positioned within grain tank 28. Grain tank level sensor 29 may be an acoustic sensor, radar sensor or the like that measures distance to the grain in the tank. Generally, tank level sensor 29 transmits a signal towards the bottom of grain tank 28 and receives a reflection signal from the grain. A controller uses the roundtrip travel time of the signal to compute the distance from the sensor to the pile of grain. The controller uses this distance to determine how much grain is in grain tank 28 at any given time. As the grain pile grows, the roundtrip travel time of the signal will decrease indicating that the grain is getting closer to the top of grain tank 28.

In another example, grain tank level sensors 31A and 31B are positioned within grain tank 28. Grain tank level sensors 31A and 31B may be pressure switches that are triggered when they come into contact with the grain pile. Sensor 31B is placed lower in the tank than is sensor 31A, so as to detect when the grain tank is partially full (e.g. 50%, 75%, etc.). Sensor 31A is placed near the top of the grain tank so as to detect when the grain tank is almost completely full (e.g. 100%). When the grain pile triggers sensor 31B, the controller determines that the grain tank is partially full to a certain level (e.g. 75% full). When the grain touches sensor 31A, the controller determines that the grain tank is completely full. Notifications may be made to the operator when these levels are detected.

Although not shown, in yet another example, grain tank level sensors 29, 31A and/or 31B may be positioned on a grain tank extension. The grain tank extension could be a metal arm that extends above the grain tank. This would allow grain tank level sensors 29, 31A and/or 31B to be positioned a set distance above the top of the grain tank. The operation of grain tank level sensors 29, 31A and/or 31B in this example would remain the same as described above.

The detection of sensors 29 or 31A and 31B is dependent on the slope of the ground that the combine is traveling on. On level ground, the detected levels are generally accurate due to a uniform grain pile in the tank. However, when the combine is harvesting on a slope or a hill, the levels detected by sensors 29, 31A and 31B may not be accurate due to the slope of a non-uniform grain pile in the tank. This is problematic, because if the actual level of the grain in the tank is higher than the level indicated by sensors 29, 31A and 31B, there is a chance that grain can overflow and spill out of the top of the grain tank. Such spillage results in lost revenue and should be avoided.

In order to avoid spillage on slopes and hills, the combine also includes an inclination sensor 33 that may be mounted anywhere on the combine, including in the operator cabin as shown in FIG. 1A. Inclination sensor 33 is a dual axis sensor that detects inclination magnitude and direction over a 360° operating range. This information is then used to determine the actual grain level in the tank which may be different than the level indicated by sensors 29, 31A and 31B. This process is described in more detail with references to later figures.

Figure 1B:
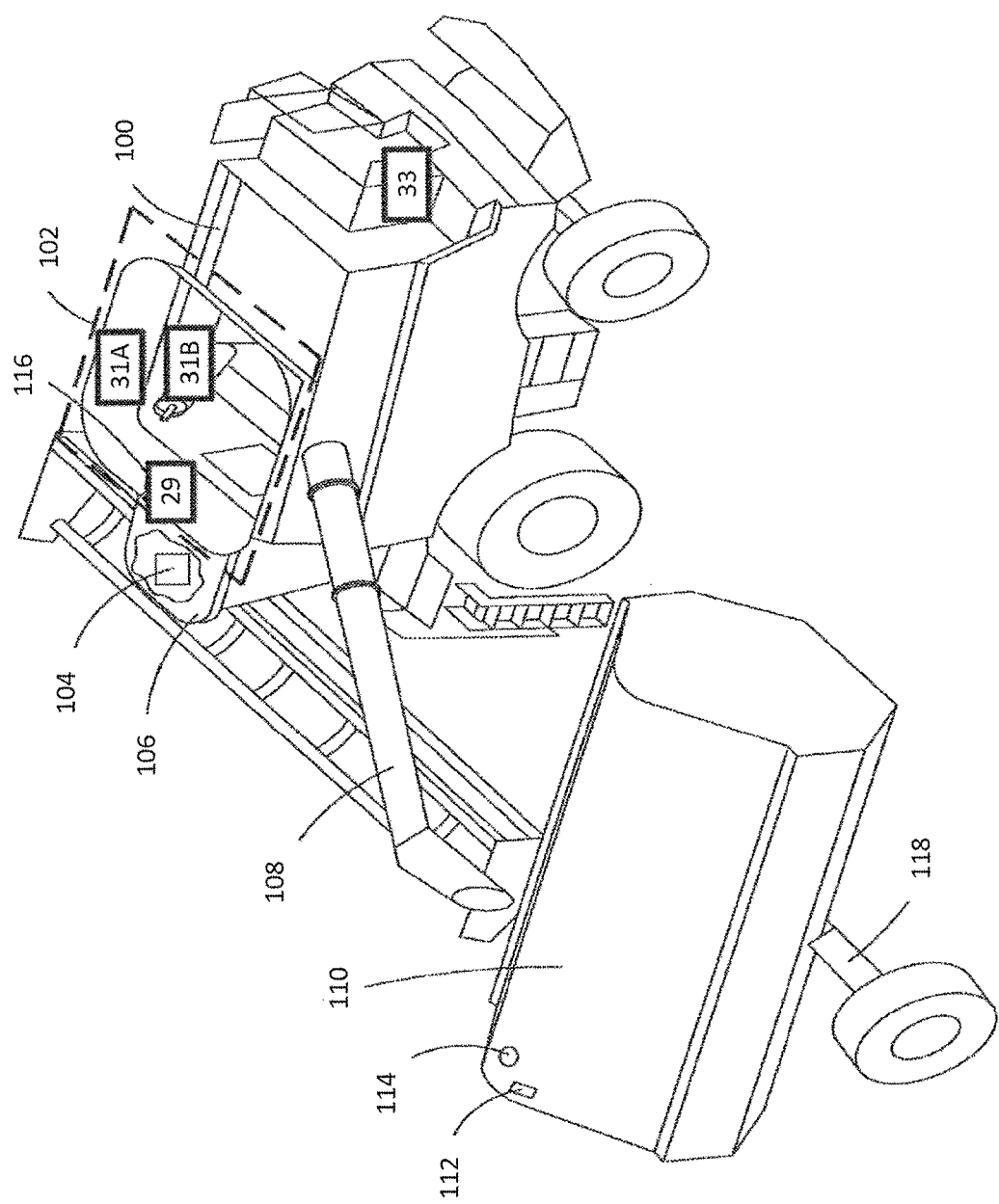
FIG. 1B is another view of a combine, according to an embodiment of the invention.

The combine in FIG. 1A is one configuration of a combine setup for performing harvesting. However, other configurations are possible. For example. FIG. 1B illustrates a perspective view of a combine that utilizes a grain cart 110 for storing the harvested grain. As shown at FIG. 1B, combine 100 includes grain tank 102 for storing grain and unload tube 108 for carrying grain from grain tank 102 to grain cart 110 when tank level sensor 29 detects that the grain has reached a certain level. Combine 100 includes a controller 104 in cab 106 and transceiver 116. Grain cart 110 may also include a transceiver 114 for communicating with combine transceiver 116, tank level sensor 112 and load cell sensor 118. In some embodiments, exemplary controllers may be placed at different locations within the cab or other locations on the combine.

In the example of FIG. 1B, the level of grain in grain tank 102 is detected by tank level sensor 29 or by sensors 31A and 31B depending on the configuration, while the level of grain in grain cart 110 is detected by tank level sensor 112 (e.g. similar to sensor 29 or sensors 31A and 31B). The controller may control the combine to send grain from grain tank 102 to grain cart 110, and measure both levels to ensure that grain does not spill either from grain tank 102 or grain cart 110.

Figure 2A:
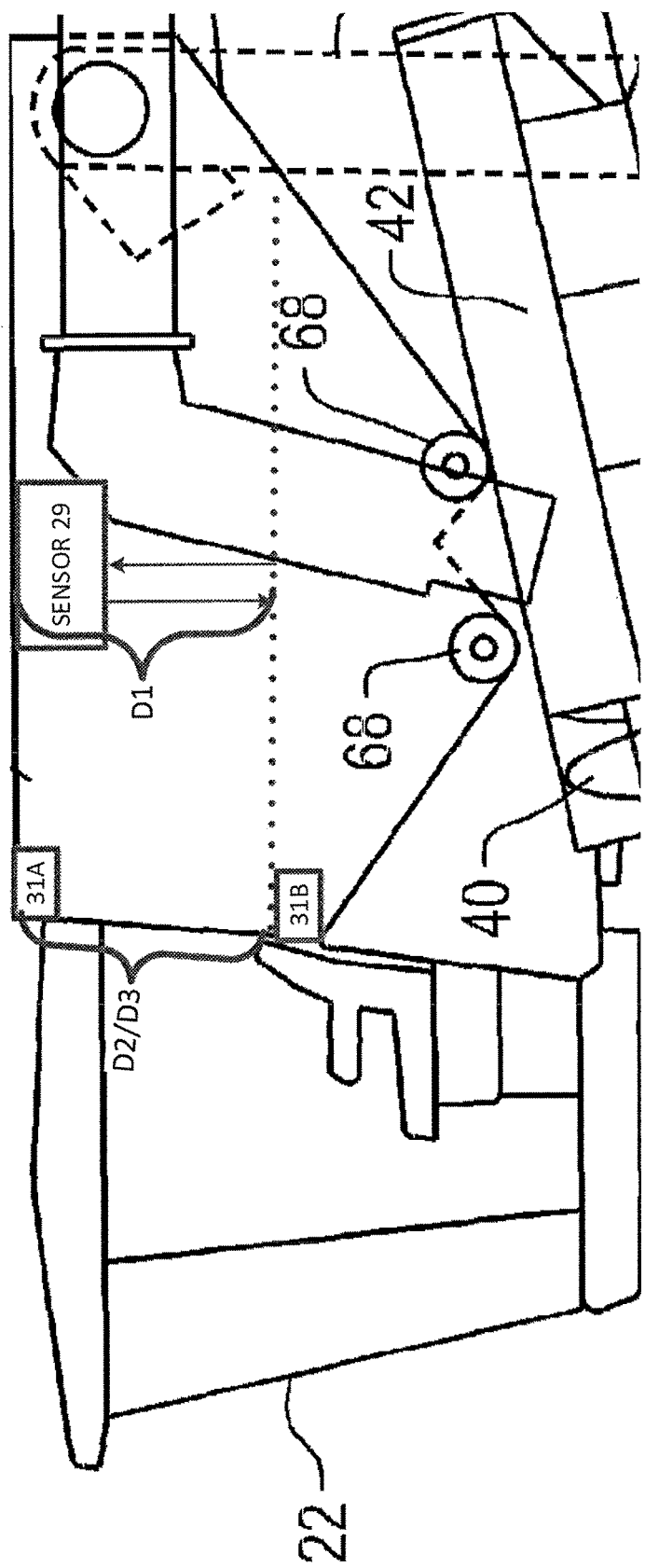
FIG. 2A is a close-up view of the grain tank sensors on a combine with a level grain pile, according to an embodiment of the invention.

FIG. 2A shows a close-up view of the sensors for the grain tank 28 from FIG. 1A, where the combine is harvesting on level ground. During operation, grain is harvested and stored in grain tank 28. As shown by the dashed line in FIG. 2A, the grain pile is fairly uniform (e.g. level with respect to the top of the grain tank) due to the level ground.

In one example, tank level sensor 29 transmits a signal that is reflected by the pile of grain. The round trip time of this signal is then used along with the known velocity (e.g. speed of light or speed of sound) of the transmitted signal to determine a distance from tank level sensor 29 to the pile of grain. This distance correlates to distance D1 from the grain pile to the top opening of the grain tank.

In another example, pressure switch 31B transmits a signal to the controller in response to being contacted by the grain pile. This indicates to the controller, that the grain has reached sensor 31B located at a predetermined location (e.g. 75% up the wall of the grain tank). The controller therefore determines that the grain tank is partially (e.g. 75%) full.

In the example shown in FIG. 2A, the highest point (closest to the top of the tank) of the grain pile is denoted as D2. Distance D1 detected by sensor 29 and distance D3 detected by sensor 31B therefore represent an accurate distance from the top (e.g. highest point) of the grain pile to the top opening of the grain tank so that the operator can determine if grain spillage might occur (e.g. D1 and D3=actual distance D2). If the grain is not near the top of grain tank 28, then the operator can continue harvesting. If, however, the grain is near the top of grain tank 28, then the operator would stop harvesting and unload the collected grain to avoid spillage.

The distances D1 and D2 from the sensors 29 and 31B to the grain pile, however, does not always directly correlate to the distance from the top of the grain pile to the top opening of the grain tank. In some scenarios (e.g. in sloped terrain), the grain pile tends to shift in a non-uniform manner where the highest portion of the grain pile is not oriented in the center of the grain tank under the sensor, but rather towards the tank walls.

Figure 2B:
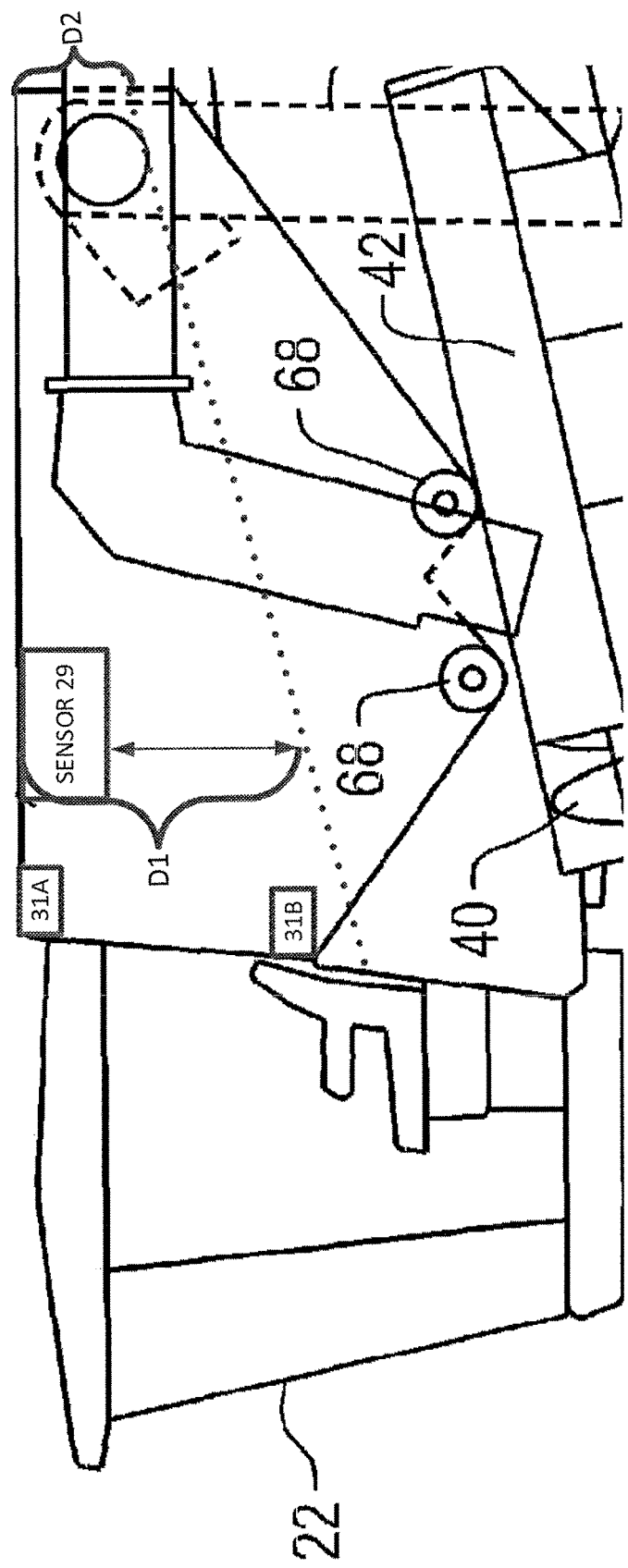
FIG. 2B is another close-up view of the grain tank sensors on a combine with a slanted grain pile, according to an embodiment of the invention.

In one example, FIG. 2B shows a grain pile where the highest point of the pile is oriented towards the back portion of the grain tank. This may occur when the combine is traveling uphill during harvesting. In one example, sensor 29 may incorrectly determine that larger distance D1 is the distance from the top (e.g. highest point) of the grain pile to the top of the grain tank, when the actual distance is only D2 which is smaller than D1. In another example, sensor 31B does not even detect the grain pile yet, even though the grain pile is only a small distance D2 from the top of the grain tank. In this example, the controller will incorrectly determine that the grain tank is not even partially (e.g. 75%) full yet. Such errors in grain level detection may result in grain spillage if D2 becomes zero.

Figure 2C:
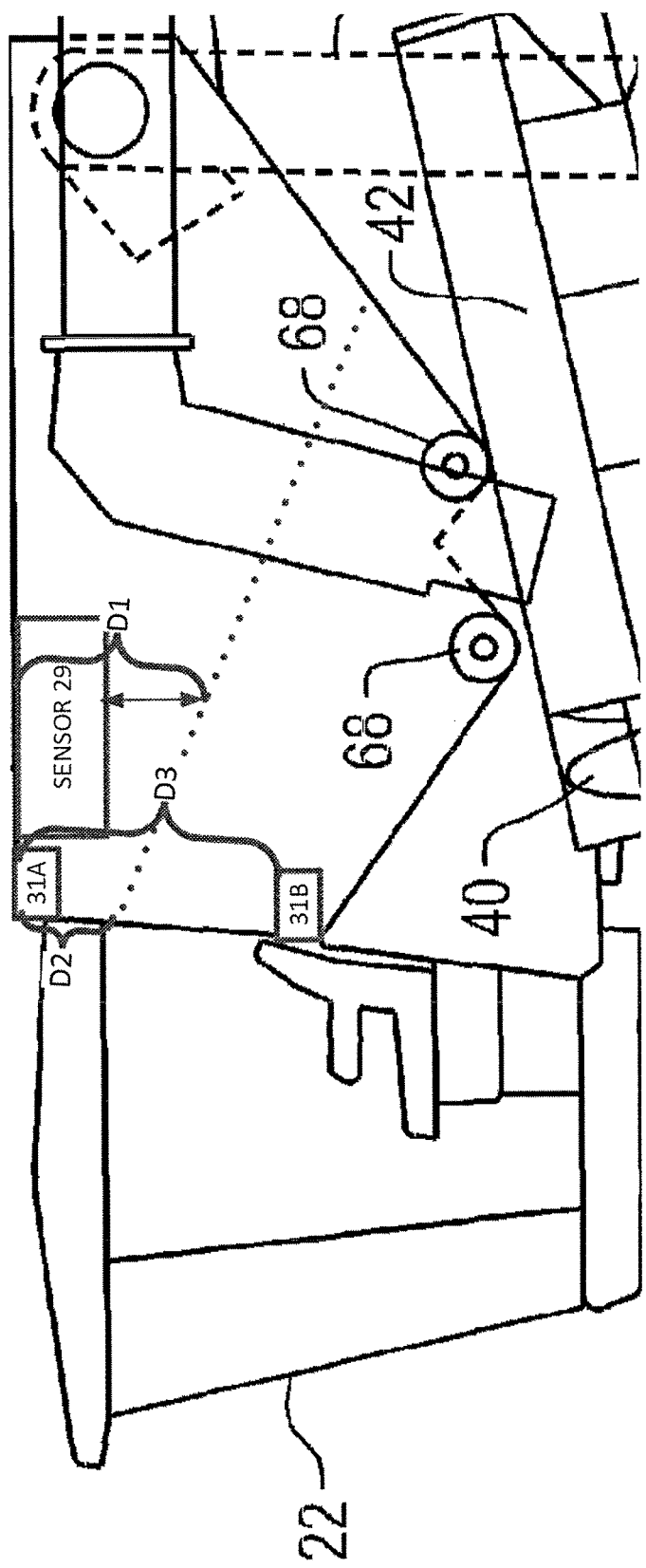
FIG. 2C is yet another close-up view of the grain tank sensors on a combine with a slanted grain pile, according to an embodiment of the invention.

In another example, FIG. 2C shows a grain pile where the highest point of the pile is oriented towards the front portion of the grain tank. This may occur when the combine is traveling downhill during harvesting. In one example, sensor 29 may incorrectly determine that larger distance D1 is the distance from the top (e.g. highest point) of the grain pile to the top of the grain tank, when the actual distance is only D2 which is smaller than D1. In another example, sensor 31B detects the grain pile, but sensor 31A does not yet detect the grain pile. In this example, the controller will incorrectly determine that the grain tank is partially (e.g. 75%) full at distance D3. Such errors in grain level detection may again result in grain spillage if D2 becomes zero.

Although FIGS. 2B and 2C show examples where the grain pile is slanted towards the back and the front of the grain tank, the grain pile may be sloped in any direction within the grain tank, including to the sides and the corners of the tank (e.g. in any 360° direction). In addition, the slope of the grain may shift during operation of the combine on rough or non-flat terrain. When the grain is sloped as shown in FIGS. 2B and 2C, the sensors may incorrectly indicate the level of grain in the grain tank. This can lead to spillage of grain in certain circumstances. For example, if the sensor determines that the distance from the grain to the tank opening is D1 or D3 when it is actually only D2, the operator may continue harvesting and spill grain (e.g. grain spills out of the top of the grain tank and revenue is lost).

In order to avoid such spillage, the combine of the present system adjusts the grain tank level detected by the sensors to reflect a more accurate representation of the grain tank level. Determining the adjustment may be based on the various factors (e.g. inclination, crop type, etc.), and may can be performed by a controller in the combine, or via a personal computer (PC) remote from the combine. This adjusted grain tank level is then used to alert the operator to avoid spillage.

Figure 3:
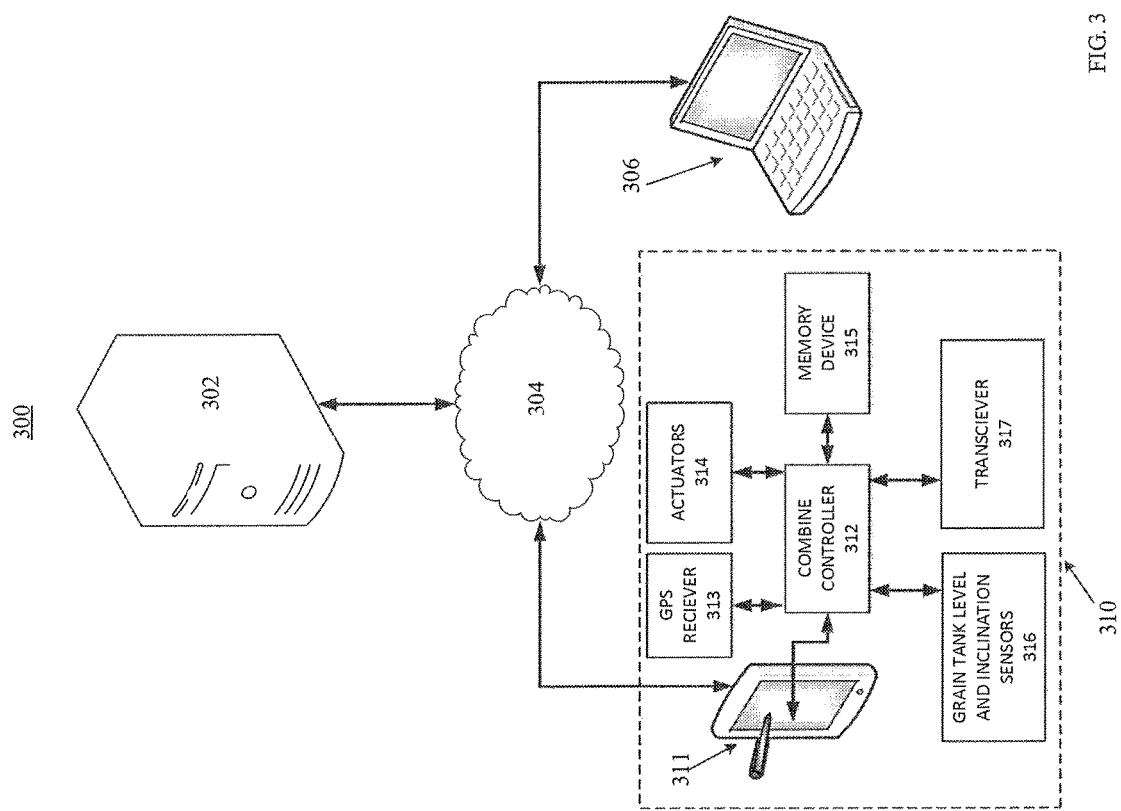
FIG. 3 is a view of the communication between the combine control system and an external network, according to an embodiment of the invention.

FIG. 3 shows an example of a system 300 for controlling the combine. The system 300 includes an interconnection between a control system 310 of combine 10, a remote PC 306 and a remote server 302 through network 304 (e.g. Internet). It should be noted that combine 10 does not have to be connected to other devices through a network. The controller of combine 10 can be a standalone system that receives operating instructions (e.g. tank level instructions such as alert levels, shifted operating ranges, etc.) through a user interface, through a removable memory device (e.g. Flash Drive) or from a server 302 via transceiver 317 (e.g. Wi-Fi, Bluetooth, Cellular, etc.).

Prior to operating combine 10, an operator may designate the tank level alerts and other tank level related instructions (e.g. tank level alerts, shifted operating ranges, terrain, etc.). In one example, the operator uses interface 311 of the combine control system or PC 306 located at a remote location. Interface 311 and PC 306 allow the operator to view locally stored parameters from memory device 315 and/or download parameters from server 302 through network 304. The operator may select (via Interface 311 or PC 306) appropriate tank level related instructions based on various factors including, among others, the type of crop to be harvested by the combine, and the terrain. Once the tank level related instructions are selected, the operator can begin harvesting. Combine controller 312 then controls actuators 314 (e.g. thresher, chopper, etc.) based on the instructions. For example, sensors 316 (e.g. tank level sensor and inclination sensor) may be used during harvesting to more accurately determine the grain level to avoid spillage. Harvesting may also be tracked and aided by GPS receiver 313 to monitor terrain.

For example, if the terrain includes slopes and/or hills, the direction and magnitude of the slope is measured by inclinometer 33. Controller 312 may use this inclination information along with other information (e.g. crop type) to estimate a more accurate grain tank level that more accurately represents the actual distance D2 from the highest point of the grain pile to the top opening of the grain tank as shown in FIGS. 2B and 2C.

Figure 4A:
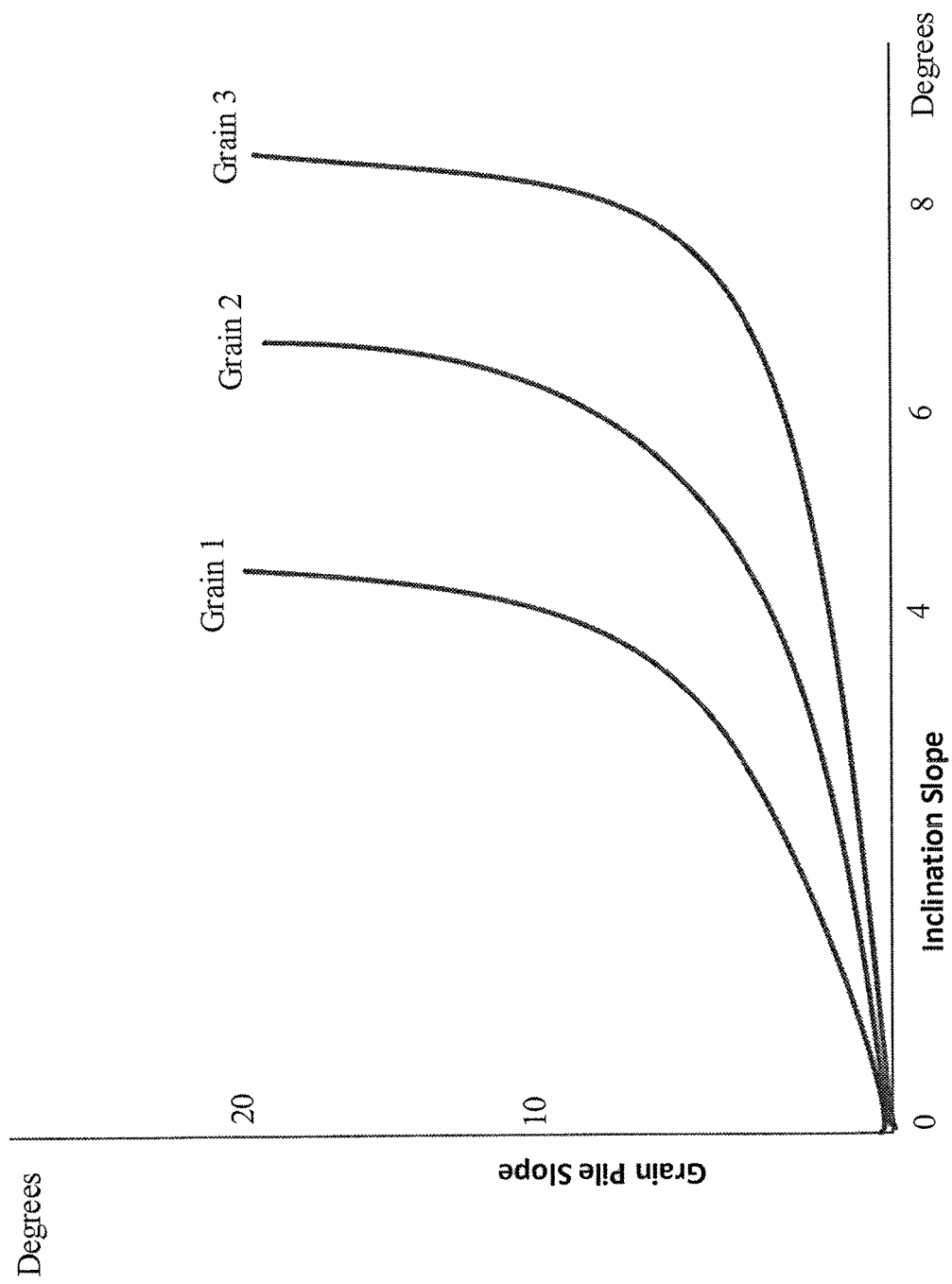
FIG. 4A is a view of a data plot showing the relationship between combine incline angle versus crop slope angle in the grain tank, according to an embodiment of the invention.

FIG. 4A shows a data plot of inclination angle (e.g. slope) detected by inclination sensor 33 versus the actual angle (e.g. slope) of the grain pile in the grain tank for three different types of grain. Naturally, the grain pile angle increases as the inclination angle of the combine increases. This is true for most grains. However, some grains, due to oils and other physical properties may pile at a steeper slope than other grains for a given combine angle. For example, as shown in FIG. 4A, grain type 1 exhibits a relatively low grain pile slope as long as the inclination slope of the combine is below 4°. The same is true of grain types 2 and 3 as long as the inclination slope of the combine is below 6° and 8° respectively. However, when the inclination slope of the combine reaches certain levels (e.g. 4°, 6° and 8°) the grain pile slopes increase significantly. In general, grain slope for different grain types may exhibit linear or non-linear behaviour in response to inclination slope of the combine. Thus, it is beneficial for controller 312 to know the type of grain being harvested, to more accurately determine the highest point of the grain pile.

Figure 4B:
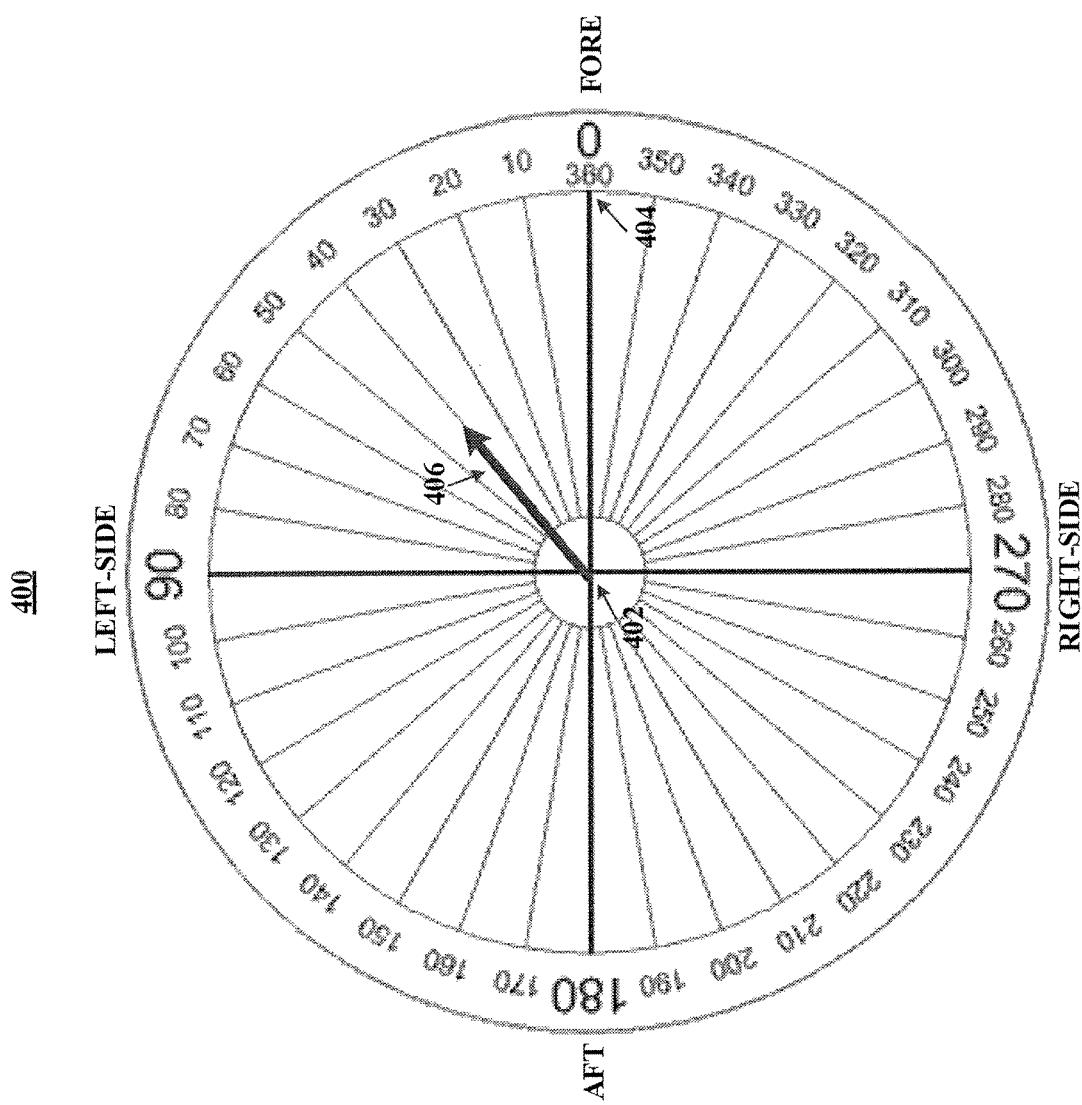
FIG. 4B is a graphical representation of a 360° inclinometer output, according to an embodiment of the invention.

The inclinometer may be a dual-axis inclinometer capable of detecting an angle of inclination in a 360° direction and its magnitude (e.g. how steep). FIG. 4B shows a graphical representation of a 360° inclinometer output. As shown, the inclinometer may detect inclines in the directions of the fore, aft, left and right sides of the combine, and any direction in between. An example 400 is provided in FIG. 4B for clarity. Specifically, vector 406 represents an incline detected by the inclinometer as the combine is traveling downhill. Vector 406 has a direction and a magnitude. The direction is 40° to the left of the fore of the combine (i.e. the combine is tilted towards the front and left). The magnitude of the vector indicates that the slope of the incline is 8°, which is almost halfway in between the minimum slope 402 of 0°, and the maximum slope 404 of 20°. This inclination information, therefore indicates to the controller 312 that the combine is tilted at a slope of 8° in a 40° direction towards the front and left of the combine. This information may then be used by controller 312 to estimate the highest point of the grain in the tank, and adjust the level output by the sensor.

Figure 5:
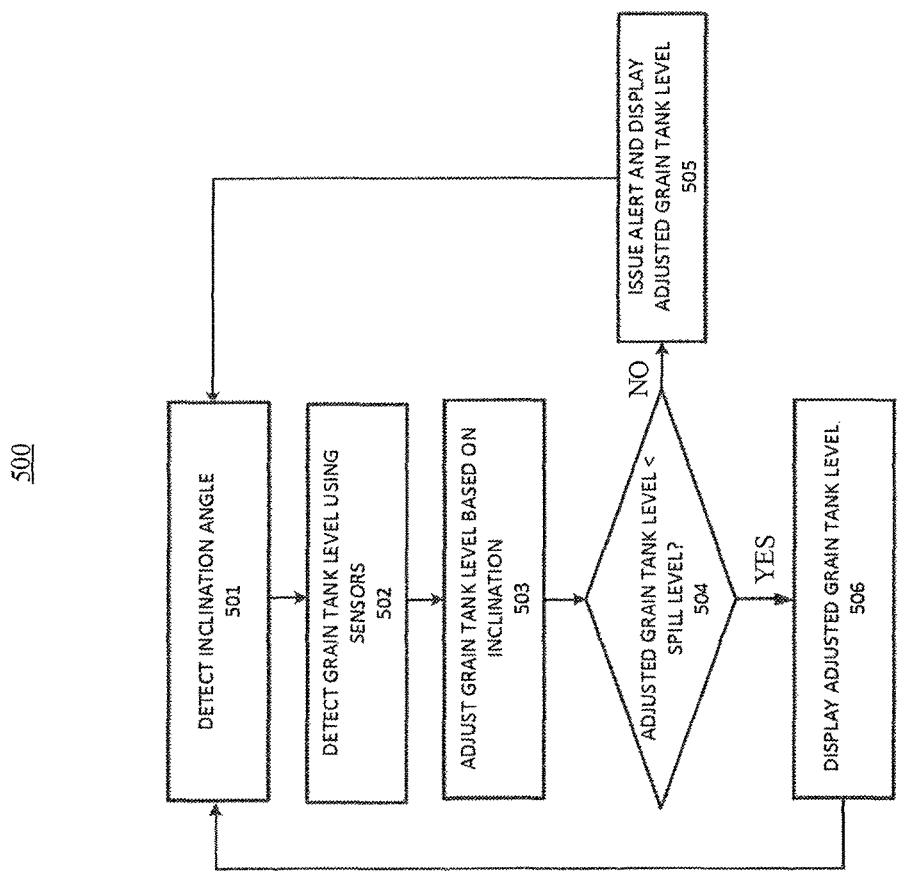
FIG. 5 is a flowchart for determining an adjusted grain tank level based on inclination, according to an embodiment of the invention.

FIG. 5 shows a flowchart 500 describing the controller operation for adjusting the detected grain tank level and alerting the operator to avoid spillage. In step 501 controller 312 uses inclination sensor 33 to determine the direction and magnitude of the combine inclination. In step 502, controller 312 uses the grain tank sensor(s) 316 (e.g. 31A, 31B, or 29) to determine the grain tank level (e.g. distance remaining to top of grain tank, percentage full, etc.).

Once the inclination and grain tank level values are determined, controller 312 then adjusts the grain tank level in step 503 to estimate a more accurate value of the grain tank level. This adjustment may be performed using a number of different methods using the inclination value, grain tank level and optionally the crop type.

A first example is now described when pressure sensors 31A and 31B are installed in the combine grain tank. During operation, controller 312 monitors the inclination of the combine using sensors 316. When pressure sensor 31B (e.g. 75% full sensor) is triggered by the grain, controller 312 estimates the slope of the grain in tank. This may be performed by a table lookup where the inclination value correlates to a predetermined slope of the grain pile. The slope of the grain pile and the measured grain tank level are used to determine a line (see the dotted line in FIG. 2C) that intersects the grain tank wall at two points. The highest intersection point is determined to be the highest point of the grain pile. After pressure sensor 31B is triggered, the grain pile level is not known until pressure sensor 31A is triggered. To deal with this "blind spot" throughput may be monitored over time to estimate growth of the grain pile. This estimated growth, along with the measured inclination may then be used to estimate the intersection points of the line representing the surface of the grain pile.

A second example is now described when ultrasonic sensor 29 is installed in the combine grain tank. During operation, controller 312 monitors the inclination of the combine, and sensor 29 determines the distance to the grain. Based on these values, controller 312 estimates the slope of the grain pile in tank. Similar to the first example, this may be performed by a table lookup where the inclination value correlates to a predetermined slope of the grain pile. The slope of the grain pile and the measured grain tank level are used to determine a line (see the dotted line in FIG. 2C) that intersects the grain tank wall at two points (high point and low point). The high intersection point is determined to be the highest point of the grain pile. As the grain pile grows, sensor 29 continues to detect the level of the pile, and inclination sensor continuously monitors the inclination of the combine. With this continuous measurement, the highest point of the pile can continuously be estimated.

After the grain tank level is adjusted based on inclination, it is determined if the grain is at risk of spilling out of the grain tank. In step 504, controller 312 makes this determination. If the adjusted grain level is determined to be less than a predetermined spill level, the level is simply displayed to the operator and harvesting continues in step 506. If, however, the adjusted grain level is determined to greater than or equal to the predetermined spill level, an alert (e.g. via interface 311) is issued to the operator in step 505.

Regardless of the method for performing the adjustment of the grain level, the operator is notified of the estimated grain level and alerted when there is a risk of spillage. This process helps avoid spillage when harvesting on uneven ground and therefore reducing lost revenue. The alert may be given by sounding an audible or visual alarm. This may be accomplished by interface 311, a dedicated bell/buzzer (not shown), an indicator light (not shown), etc.

The steps of adjusting the grain tank level based on inclination shown in steps 501-506 of FIG. 5 are performed by control system 310 including controller 312 upon loading and executing software code or instructions which are tangibly stored on a tangible computer readable medium 315, such as on a magnetic medium, e.g., a computer hard drive, an optical medium, e.g., an optical disc, solid-state memory, e.g., flash memory, or other storage media known in the art. Thus, any of the functionality performed by the controller 312 described herein, such as the steps shown in FIG. 5, are implemented in software code or instructions which are tangibly stored on a tangible computer readable medium. Upon loading and executing such software code or instructions by the controller 312, the controller 312 may perform any of the functionality of the controller 312 described herein, including the steps shown in FIG. 5 described herein.

The term "software code" or "code" used herein refers to any instructions or set of instructions that influence the operation of a computer or controller 312. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

Although the invention is illustrated and described herein with reference to specific embodiments, the invention is not intended to be limited to the details shown. Rather various modifications may be made in the details within the scope and range of equivalence of the claims and without departing from the invention.

The invention claimed is:

1. A combine comprising:
   a feeder housing for receiving harvested crop;
   a separating system for threshing the harvested crop to separate grain from residue;
   a grain tank for storing the separated grain;
   a grain tank level sensor for detecting a level of grain in the grain tank;
   an inclination sensor for detecting inclination of the combine; and
   a controller that controls the combine, the controller configured to:
   receive the grain tank level from the grain tank level sensor,
   receive an inclination value from the inclination sensor,
   compute an adjusted grain tank level that is higher in the grain tank than the grain tank level detected by the sensor, by:
   estimating an intersection point where the grain pile intersects the grain tank due to the inclination value, and
   setting the adjusted grain tank level based on the intersection point, and
   alert an operator of the adjusted grain tank level.

2. The combine of claim 1,
   wherein the inclination sensor is a dual axis sensor measuring inclination in a fore-to-aft direction of the combine and a side-to-side direction of the combine.

3. The combine of claim 1,
   wherein the inclination value includes an inclination angle and an inclination direction.

4. The combine of claim 1,
   wherein the controller is further configured to adjust the grain tank level based on at least one of a type of the crop being harvested, and a geometry of the grain tank.

5. The combine of claim 1,
   wherein the grain tank level sensor includes:
   a first sensor for detecting the grain tank level as being partially full, and
   a second sensor for detecting the grain tank level as being full.

6. The combine of claim 1,
   wherein the grain tank level sensor includes at least one of a radio frequency (RF) sensor or an ultrasonic sensor for detecting the grain tank level.

7. The combine of claim 1,
   wherein the controller is further configured to determine the grain tank level at a point of the grain surface closest to a top of the grain tank.

8. The combine of claim 1,
   wherein the controller is further configured to determine the grain tank level at a point on a line or a plane defining a surface of the grain.

9. The combine of claim 1,
   wherein the grain tank level sensor is at least one of a pressure sensor or a distance sensor.

10. The combine of claim 1,
    wherein the controller is further configured to alert the operator of the adjusted grain tank level by sounding an audible or visual alarm, or by displaying the adjusted grain tank level.

11. A method for controlling a combine including a chassis, a feeder housing for receiving harvested crop, a separating system for threshing the harvested crop to separate grain from residue, a grain tank for storing the separated grain, a grain tank level sensor for detecting a grain level in the grain tank, an inclination sensor for detecting inclination of the combine, and a controller that controls the combine, the method comprising:
    receiving, by the controller, the grain tank level from the grain tank level sensor;
    receiving, by the controller, an inclination value from the inclination sensor;
    computing, by the controller, an adjusted grain tank level that is higher in the grain tank than the grain tank level detected by the sensor, by:
    estimating an intersection point where the grain pile intersects the grain tank due to the inclination value, and
    setting the adjusted grain tank level based on the intersection point; and
    alerting, by the controller, an operator of the adjusted grain tank level.

12. The method of claim 11, further comprising:
    detecting, by the inclination sensor, inclination in a fore-to-aft direction of the combine and a side-to-side direction of the combine.

13. The method of claim 11, further comprising:
    detecting, by the inclination sensor, the inclination value as an inclination angle and an inclination direction.

14. The method of claim 11, further comprising:
    adjusting, by the controller, the grain tank level based on at least one of a type of the crop being harvested, and a geometry of the grain tank.

15. The method of claim 11, further comprising:
    detecting, by the grain tank level sensor, the grain tank level as being partially full or full.

16. The method of claim 11, further comprising:
    transmitting, by the grain tank level sensor, at least one of a radio frequency (RF) signal or an ultrasonic signal towards the grain to detect the grain tank level.

17. The method of claim 11, further comprising:
    determine, by the controller, the grain tank level at a point of the grain surface closest to a top of the grain tank.

18. The method of claim 11, further comprising:
    determining, by the controller, the grain tank level at a point on a line or a plane defining a surface of the grain.

19. The method of claim 11, further comprising:
    detecting, by the grain tank level sensor at least one of a pressure signal or a distance signal.

20. The method of claim 11, further comprising:
    alerting, by the controller, the operator of the adjusted grain tank level by sounding an audible or visual alarm, or by displaying the adjusted grain tank level.

* * * * *